United States Patent Office 3,000,897
Patented Sept. 19, 1961

---

3,000,897
CITRAZINIC ACID-AMINE-OXYGEN DYES
Frederick L. Thomas, 609 Piper Drive, Madison, Wis.
No Drawing. Filed Oct. 23, 1958, Ser. No. 769,060
18 Claims. (Cl. 260—295)

This invention relates to methods for making citrazinic acid-amine dyes and compositions and compounds produced by such methods.

It has been known that citrazinic acid salts give a characteristic blue or green color. However, such color was not isolated and was considered solely as the property of the neutral salts of citrazinic acid itself.

Also, it has been known that citrazinic acid forms useful dyes when coupled with diazo compounds. The present invention in no way refers to dyes made by the diazo process or diazotization.

An object of this invention is to provide a method for the production of dyes inexpensively and in good yield.

An additional object is the production of dyes which may be used advantageously and inexpensively as water soluble colors for crayons, and water colors, inks, paint pigments and lacquers. By reason of its oxidizing potential and complete water solubility certain of the combinations of citrazinic acid amines should also prove useful as bleaching or whitening agents for laundering textiles, as bacteriostats, as analytical reagents for detection of presence of an amine group in complex organic compounds, and numerous other uses.

Other objects and advantages of the invention will be apparent from the following detailed description.

It was previously believed that color formed when sodium citrazinate reacted with air. It was not known that the reason the color formed is because citrazinic acid is employed in the color formation in two distinct ways because of its nitrogen atom. I have discovered that citrazinic acid (2,6-dihydroxy-4-carboxy pyridine), or its ionic form in solution can combine with any nitrogen atom of another molecule in ammonia, mono alkyl or aryl, dialkyl or diaryl, tri alkyl or aryl amines, or when present as a member of a resonating heterocyclic ring to form the dye complex (normally blues and greens, though as herein shown, in some instances shades of red and violet and other colors are produced). Because citrazinic acid itself has such a nitrogen atom it can combine with itself as a bimolecular reaction with respect to citrazinic acid to form the dye complex. The dye complex does not derive from sodium citrazinate because of a reaction with the air and water which is monomolecular with respect to the acid. As hereinafter shown the dye complex formed in the oxidation of sodium citrazinate is a special case, which fits within the rules governing dye complex formation.

I have further discovered a process for making novel compositions from citrazinic acid and amines in any concentration from dilute to concentrated and hydrogen peroxide from 0.5% to 30% in strength. Higher strengths of peroxide are not as desirable since the peroxide must be destroyed quickly, to prevent a change of the color and peroxidation.

A further novelty of my invention rests in the variety of nitrogen-containing compounds which will generate the dye complex. Although, as stated, citrazinic acid can be used alone (and not as a soluble salt), I have found that the dye complex forms more quickly and with better results if a peroxide, either organic or inorganic, and particularly hydrogen peroxide, is used in the process as an oxidizing agent. Although I prefer to use hydrogen peroxide of a strength in the reaction mixture between 0.01% and 30% a strength between 0.1% and 3% is the most suitable. The higher strengths tend to be destructive and the weaker strengths require too long a reaction time.

The amine reactant can be neutralized with mineral acids and/or organic acids before reacting with the citrazinic acid. I prefer to use hydrochloric or acetic acids. When the reaction products so formed are used to treat test fabrics and subsequently oven dried for ½ hr., the colors produced are more wash fast.

When the amino compounds are water soluble or water miscible no other solvent is required, although I prefer to remove the water as rapidly as possible and at as low a temperature as feasible in order to stabilize the resulting colored reaction products. However, for amino compounds which are predominately oil soluble, other solvents can be used alone or in part with water.

I have found as the hydrocarbon chain becomes extended, the colors produced become more feeble and unstable and hence their use related to dyestuffs becomes limited. Because of this I restrict the scope of this invention to amines as follows:

$R_1$ equal to 18 or less carbon atoms where $R_2$ and $R_3$ are hydrogen.
$R_1$ and $R_2$ each equal to 12 or less carbon atoms where $R_3$ is hydrogen.
$R_1$, $R_2$ and $R_3$ each equal to 8 or less carbon atoms.

All amines where $R_1$, $R_2$ and/or $R_3$ are aromatic hydrocarbon rings are excluded from this invention, although, not excluded are aromatic groups attached to the hydrocarbon chain and removed by one or more methylene groups such as dibenzyl amine where $R_1$ and $R_2$ have the structure.

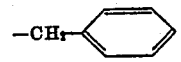

EXAMPLE I 15.5 parts of citrazinic acid and 18.6 parts of monoethanolamine are mixed and warmed to 50° C. The acid dissolves and the mass turns green. The reaction can be accelerated by the addition of peroxide but was obtained by continued exposure to air for 12 hours. A glossy green resin is obtained, completely soluble in water. Upon standing the film exposed to air retains the color, and the protected portions revert to a brown color. The mass was heated to 90° C. at which the color changed to brown. On cooling the green color returns. Heating to 130° C. permanently destroys the color. A separate portion of the dye which had not been heated was neutralized with glacial acetic acid. 10% water solution of calcium chloride was added in an amount not exceeding one-third of the dye mixture. A flocculent green precipitate formed. The green precipitate was removed by filtration. The filtrate was pale blue. The washed and dried green precipitate was heat resistant up to 200° C.

EXAMPLE II

Example I was repeated in two separate parts. In each absolute methanol was used as the solvent. Air was excluded in a glass joined apparatus by boiling all reactants previously. The amine was introduced from a closed dropping funnel. Only a trace of color appeared on the surface of the amine. Admitting dried air caused no change, in the first reaction. Admitting boiled and cooled water free of dissolved air from a closed dropping funnel caused only a trace more color in the other reaction. Admitting air and water caused a copious quantity of the alcohol-water soluble dye.

EXAMPLE III

The same procedure was used as in Example I, except that 22.5 parts of 3-amine propanol was added in place of the monoethanol amine. A brilliant blue color developed. The dye was glossy and resinous. Extracting with absolute methanol yielded a water soluble residue and methanol soluble fraction. The residue was precipitated in part with calcium chloride. The isolated precipitate was heat resistant. No residue after water extraction was obtained.

EXAMPLE IV

The same procedure was used as in Example I, except that 96 parts by weight of dehydroabietylamine (specifically the proprietary product of Hercules Powder Co., Rosin Amine D), was added in place of the monoethanolamine. 250 parts by weight isopropyl alcohol (91%) and water 9% (proprietary produce known as Petrohol 91) was added as a solvent. 100 parts by weight of 3% hydrogen peroxide was added. A blue dye was obtained which precipitated in cold solvent and with addition of water. It was soluble in a hydrocarbon of having principal boiling point of 180° C. Addition of n-butanol to the precipitate in mineral spirits with ethyl cellulose formed a lacquer which shows resistance to acid and a alkali bleaching. It coated fabrics with a green water repellant film.

EXAMPLE V

The same procedure and reactants were used as in Example IV, except 250 parts odorless Stoddard Solvent having principal boiling point of 180°–190° C. was used in place of isopropyl alcohol. After four hours at 100°–110° C. conversion was incomplete to a yellow-green color. Exposure to air with agitation resulted in a green colored liquor with 23% by weight of reactants as residue. The residue was green in color and all but 14% by weight of original reactants were soluble upon dilution with solvent. Additional hydrogen peroxide deepened the green to a blue green.

EXAMPLE VI

The same procedure and reactants were used as in Example IV, except that 250 parts of normal butanol were used in place of isopropyl alcohol. The normal butanol was a good solvent for the reaction, keeping all the ingredients in good contact. The solvent was evaporated, resulting in a green lacquer gum.

In some instances I find it desirable to treat with hydrogen peroxide both before reaction with citrazinic acid and afterwards as illustrated in the following example.

EXAMPLE VII 23 parts by weight of a 40% monomethyl amine solution, 15.5 parts of citrazinic acid, and 10 parts of a 3% hydrogen peroxide solution were stirred at 70° C with 10 parts of distilled water. After 5 minutes an intense blue color was formed. This dye was found suitable for nylon, silk, and wool fabrics.

EXAMPLE VIII 34 parts by weight of a 40% dimethylamine solution were added to 18.2 parts of glacial acetic acid to neutralize the amine. To this solution 15.5 parts of citrazinic acid and 20 parts of a 3% hydrogen peroxide solution were added and mixed while maintaining the temperature at 50° C. for 20 minutes. A blue color formed which was found suitable for dyeing nylon, silk, and wool.

EXAMPLE IX 59 parts of a 30% trimethyl amine solution, 15.5 parts of citrazinic acid, and 5 parts of a 3% hydrogen peroxide solution were mixed with 20 parts of distilled water at 80° C. for 10 minutes. A blue-black color formed which was found suitable for dyeing nylon, silk, and wool.

EXAMPLE X 30 parts by weight of monoethanolamine, 15 parts of citrazinic acid, and 50 parts of a 3% solution of hydrogen peroxide solution were mixed and heated to about 50° C. but after 20 minutes no color had formed. Addition of 40 parts of concentrated hydrochloric acid caused a blue-green color to form which was found suitable for dyeing acetate, cotton, nylon, silk, viscose, wool, and Orlon fabrics.

EXAMPLE XI 26 parts by weight of Armeen 8D (Armour Chemical Co.) made up of 3% n-hexyl amine, 7% n-decyl amine, and 90% n-octyl amine, 15.5 parts of citrazinic acid, and 300 parts of a 3% hydrogen peroxide solution were heated for one-half hour at 90° C. with stirring. A blue-black color developed which was found suitable for dyeing wool, silk and nylon.

EXAMPLE XII 55 parts by weight of Armeen TD (2% tetradecyl amine, 24% hexadecyl amine, and 46% octadecenyl amine), 15.5 parts of citrazinic acid, 200 parts of a 3% hydrogen peroxide solution and 100 parts of 91% isopropyl alcohol were mixed at 70° C. for 45 minutes. The blue color which formed was suitable for dyeing wool, silk and nylon.

EXAMPLE XIII 17 parts by weight of hydrazine sulfate and 9 parts of NaOH were mixed with 100 parts of distilled water. 5 parts of citrazinic acid and 40 parts of a 3% hydrogen peroxide solution were added with a resulting alkaline pH. The mixture was heated to boiling resulting in a pale green color and gas evolution. The mixture was then acidified to a pH of 2 and then neutralized (pH=7) with NaOH. 20 parts of 3% hydrogen peroxide were added and the mixture heated to 60° C. for one-half hour and then cooled. An intense violet color formed which was suitable as a dye for wool, silk and nylon. The color is fast to ultra violet light.

EXAMPLE XIV 44 parts by weight of tetrakis-N,N,N',N'-1-(2 hydroxy N-propanol) ethylenediamine, 15 parts of citrazinic acid, and 30 parts of 3% hydrogen peroxide were heated for 20 minutes at 80° C. A brilliant blue developed which was suitable for dyeing wool, silk, and nylon.

A separate portion of the dye was acidified with benzoic acid resulting in a violet color which also was suitable for dyeing wool, silk, and nylon.

In order to further illustrate the scope of this invention but not to restrict it to the compounds given the following table represents amines which undergo a reaction with citrazinic acid and hydrogen peroxide. One mole of citrazinic acid, two to three moles of the amino compounds and one-third mole of hydrogen peroxide under mild heat (50°–100° C.) are conditions in the reactions represented by the amino compounds in the table.

*Table 1*

| Primary amines: | Color |
|---|---|
| Methyl amine | Blue. |
| Ethyl amine | Blue. |
| n-Butyl amine | Blue. |
| Hydroxylamine | Blue black. |
| Dehydroabietyl amine | Green. |
| Glycine | Violet. |
| d'l-Tyrosine | Green. |
| Monoethanolamine | Green. |
| 3-amino propanol | Blue. |
| 2-amino-1-butanol | Green and violet. |
| 2-amino-2-methyl-1-propanol | Blue. |

Table I—Continued

| Primary amines—Continued | Color |
|---|---|
| 2-amino-2-ethyl-1,3-propanediol | Blue. |
| 2-amino-2-methyl-1,3-propanediol | Blue. |
| Tris-(hydroxymethyl)amino methane | Blue. |
| Acetamide | Blue. |
| Chloroacetamide | Dull green. |
| Secondary amines: | |
| Dimethylamine | |
| Diethylamine | |
| Di-n-butylamine | Blue. |
| Morpholine | Blue. |
| Pyrrole | Green. |
| Dibenzylamine | Pale green. |
| Tertiary amines: | |
| Trimethylamine | Blue. |
| Triethylamine | Blue. |
| Tri-n-butylamine | Blue. |
| Tri-octylamine | Blue |
| Pyridine | Violet. |
| Citrazinic acid | Dull blue black. |
| Triethanolamine | Brilliant blue. |
| Dimethyl amino ethanol | Violet. |
| Diethyl amino ethanol | Violet. |
| Beta-diethyl amino ethyl chloride | Blue. |
| Beta-dimethyl amino ethyl chloride | Blue. |
| Beta-dimethyl amino isopropyl chloride | Blue. |
| Gamma-dimethyl amino propyl chloride | Dull violet. |
| Alpha-(N-pyrryl)acetic acid ethyl ester | Blue. |
| Di and polyamines: | |
| Hydrazine | Blue. |
| Ethylene diamine | Green. |
| Diethylene triamine | Red orange. |
| Triethylene tetramine | Pale green. |
| Tetra-kis N,N,N',N'-1-(2 hydroxypropyl)ethylene diamine (Quadrol) | Violet blue. |
| Ethylene diamine tetra acetic acid (Tetrine) | Violet blue. |

Therefore, it is seen the disclosure particularly forming the basis of this Letters Patent is the discovery adding to the prior art concerning the development of the blue or green color of neutral salts of citrazinic acid. Specifically I have found that a separate nitrogen atom

combines with citrazinic acid in the presence of oxygen. Where $R_1$ can be hydrogen, alkyl, aryl, or acyl.

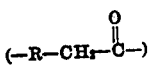

In many cases neutral salt formation is highly improbable, as in the case of $R_1$=acyl. $R_2$ and $R_3$ can be hydrogens or hydroxyls or alkyl groups.

Further, I have found out that the reaction is associated with an amine oxide or amine oxide hydrate structure of nitrogen

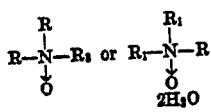

(R=alkyl groups.)

The hydroxides of secondary alkyl amines or substituted hydroxyl amines are readily formed:

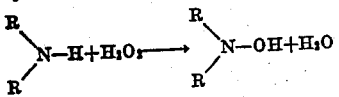

are particularly effective. Such compounds appear to combine directly with citrazinic acid to form a dye complex.

The term "amines" as used in this application shall include, unless otherwise expressly stated:

*Primary amine.*—Designated by the formula: R—NH₂, where R is an alkyl made up of a straight chain unsubstituted hydrocarbon represented by the formula:

$$CH_3-(CH_2)_x-$$

$x$ varies from zero to 17.

*Secondary amines.*—Designated by the formula:

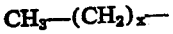

where $R_1$ and $R_2$ are alkyl groups as defined under primary amines but where $x$ in either or both $R_1$ and $R_2$ varies from zero to 11.

*Tertiary amines.*—Designated by the formula:

where $R_1$, $R_2$, and $R_3$ are alkyl groups as defined under primary amines but where $x$ in any one, two or all alkyl groups can vary from zero to 7.

*Other amines.*—Hydrazine; ethanolamine; 3-aminopropanol; triethanolamine; morpholine; pyridine; N,N-dibenzylamine; and glycine.

Lacquer formulations can be made directly from the dye solution by addition of n-butanol and other lacquer resin solvents. With ethyl cellulose a water repellant coating is obtained when applied to cotton.

Citrazinic acid-amine dyes also can be made in accordance with my invention by incorporating organic peroxides such as acetyl peroxide, lauryl peroxide, cyclohexyl methyl peroxide, ditertiary butyl peroxide and benzoyl peroxide. Such peroxides are preferred in the production of oil soluble amines and oil soluble dyes.

The present application is a continuation-in-part of my copending application Serial No. 503,817 filed April 25, 1955, now abandoned.

It will be understood that the present invention is not confined to the precise methods and procedures nor the precise compositions and compounds as herein illustrated and described, but employs all modifications thereof within the scope of the following claims.

I claim:

1. The method for the preparation of citrazinic acid-amine dyes comprising, reacting citrazinic acid with a primary amine as defined in the following formula:

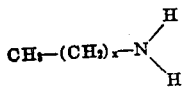

where $x$ is an integer from 0 to 17, in the presence of aqueous hydrogen peroxide at a temperature of about 50° C. to about 100° C.

2. The method described in claim 1 wherein the reaction occurs with a plurality of said primary amines.

3. The method described in claim 1 wherein said amine is neutralized before reaction with an acid from the group consisting of hydrochloric acid and acetic acid.

4. The method for the preparation of citrazinic acid-amine dyes comprising, reacting citrazinic acid with a secondary amine as defined in the following formula:

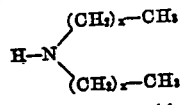

where $x$ is an integer from 0 to 11, in the presence of aqueous hydrogen peroxide at a temperature of about 50° C. to about 100° C.

5. The method described in claim 4 wherein the reaction occurs with a plurality of said secondary amines.

6. The method described in claim 4 wherein said amine is neutralized before reaction with an acid from the group consisting of hydrochloric acid and acetic acid.

7. The method for the preparation of citrazinic acid-amine dyes comprising, reacting citrazinic acid with a tertiary amine as defined in the following formula:

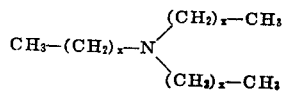

where $x$ is an integer from 0 to 7, in the presence of aqueous hydrogen peroxide at a temperature of about 50° C. to about 100° C.

8. The method described in claim 7 wherein the reaction occurs with a plurality of said tertiary amines.

9. The method described in claim 7 wherein said amine is neutralized before reaction with an acid from the group consisting of hydrochloric acid and acetic acid.

10. The method for the preparation of citrazinic acid-amine dyes comprising, reacting citrazinic acid with a mixture of primary, secondary and tertiary amines as defined in the following formulae:

(a) As to primary amines:

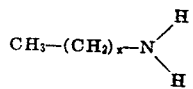

where $x$ is an integer from 0 to 17.

(b) As to secondary amines:

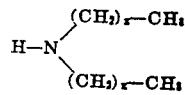

where $x$ is an integer from 0 to 11.

(c) As to tertiary amines:

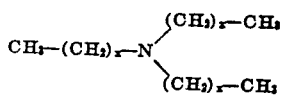

where $x$ is an integer from 0 to 7, in the presence of aqueous hydrogen peroxide at a temperature of about 50° C. to about 100° C.

11. The method described in claim 10 wherein said amines are neutralized before reaction with an acid from the group consisting of hydrochloric acid and acetic acid.

12. The method for the preparation of citrazinic acid-amine dyes comprising reacting citrazinic acid with an amine of the group consisting of alkyl-$NH_2$ where "alkyl" is from 1–18 carbon atoms, such amines substituted with a member of the group consisting of carboxyl, carbamyl, chloro and up to two hydroxyl groups, (alkyl)$_2$NH, where "alkyl" is from 1–12 carbon atoms, (alkyl)$_3$N, where "alkyl" is from 1–8 carbon atoms, the corresponding hydroxy alkyl amines, morpholine, pyrrole, pyridine, citrazinic acid, phenyl (lower alkyl) amines, octadecenyl amine, hydrazine, lower alkylene diamines, N-hydroxy lower alkyl ethylene diamine, carboxy methyl ethylene diamine and dehydroabietinyl amine, in the presence of aqueous hydrogen peroxide at a temperature of about 50° C. to about 100° C.

13. The method described in claim 12 wherein said amines are neutralized before reaction with an acid from the group consisting of hydrochloric acid and acetic acid.

14. The method described in claim 12, wherein said reaction takes place at a temperature not exceeding approximately 100° C.

15. The method described in claim 1, wherein the reaction contains a solvent in addition to water.

16. The method described in claim 4, wherein the reaction contains a solvent in addition to water.

17. The method described in claim 7, wherein the reaction contains a solvent in addition to water.

18. The method described in claim 12, wherein the reaction contains a solvent in addition to water.

References Cited in the file of this patent

Behrman et al.: Ber. Deut. Chem., vol. 17, pages 2687–2690 (1884).

Easterfield et al.: J. Chem. Soc. (London), vol. 61, page 1008 (1892).

Sell et al.: J. Chem. Soc. (London), vol. 63, pages 1035–1051 (1893).

Easterfield et al.: J. Chem. Soc. (London), vol. 65, pages 28–31 (1894).